United States Patent [19]
Anderson et al.

[11] Patent Number: 5,093,177
[45] Date of Patent: Mar. 3, 1992

[54] SHAPING GLASS SHEETS

[75] Inventors: James G. Anderson, Beaver Dams, N.Y.; Jack A. Bricker, Tarentum; Earl L. May, Irwin, both of Pa.

[73] Assignee: PPG Industries, Inc., Pittsburgh, Pa.

[21] Appl. No.: 450,966

[22] Filed: Dec. 15, 1989

[51] Int. Cl.$^5$ .......................... B32B 3/02; B60J 1/02
[52] U.S. Cl. ...................................... 428/81; 428/131; 428/174; 428/192; 65/93; 65/102; 296/96.21; 296/201
[58] Field of Search .................. 428/174, 156, 192, 81, 428/83, 121, 131, 426; 65/64, 66, 93, 102, 106; 52/792; 296/84.1, 85, 90, 201, 96.21

[56] References Cited

U.S. PATENT DOCUMENTS

| | | | |
|---|---|---|---|
| 1,482,950 | 2/1984 | Stead | 351/168 |
| 2,879,628 | 3/1959 | Kucera | 49/1 |
| 3,177,060 | 4/1965 | Pedersen | 65/106 |
| 3,193,367 | 7/1965 | Giffen | 65/70 |
| 3,282,013 | 11/1966 | Boicey | 52/624 |
| 3,385,000 | 5/1968 | Sturtevant et al. | 49/440 |
| 3,582,454 | 6/1971 | Giffen | 65/105 |
| 3,677,731 | 7/1972 | Martin | 65/102 |
| 3,883,335 | 12/1973 | Polaert | 65/4 |
| 4,074,996 | 2/1978 | Hagedorn et al. | 65/106 |
| 4,157,254 | 6/1979 | Thomas et al. | 65/273 |
| 4,173,461 | 11/1979 | Ebata et al. | 65/106 |
| 4,184,864 | 1/1980 | Reese | 65/285 |
| 4,213,072 | 5/1979 | Veith et al. | 313/217 |
| 4,615,731 | 10/1986 | Matsuyoshi | 428/174 |
| 4,674,247 | 6/1987 | Hayashi | 52/208 |
| 4,749,400 | 6/1988 | Mouly et al. | 65/97 |
| 4,762,481 | 8/1988 | Weaver | 425/116 |
| 4,762,904 | 8/1988 | Nakama | 428/122 |
| 4,776,132 | 10/1988 | Gold | 49/375 |
| 4,828,900 | 6/1989 | Mouly | 428/192 |
| 4,883,524 | 11/1989 | Bristol | 65/37 |
| 4,943,179 | 8/1988 | Horiki et al. | 403/269 |

FOREIGN PATENT DOCUMENTS 0075445 3/1983 European Pat. Off. .
0447020 7/1927 Fed. Rep. of Germany .
1547181 6/1979 United Kingdom .

Primary Examiner—Ellis P. Robinson
Assistant Examiner—Donald J. Loney
Attorney, Agent, or Firm—Gay Ann Spahn; Andrew C. Siminerio; Donald C. Lepiane

[57] ABSTRACT

Selected portions of a glass sheet are heated to elevated temperatures and offset, i.e. reformed, relative to the remaining portions of the glass sheet while maintaining the optical properties of the remaining portions of the glass sheet. The reformed area can be used as a structure to which guide brackets are other hardware can be secured or as an integral glass ledge to guide the up and down movement of the glass sheet within a vehicle door frame.

11 Claims, 2 Drawing Sheets

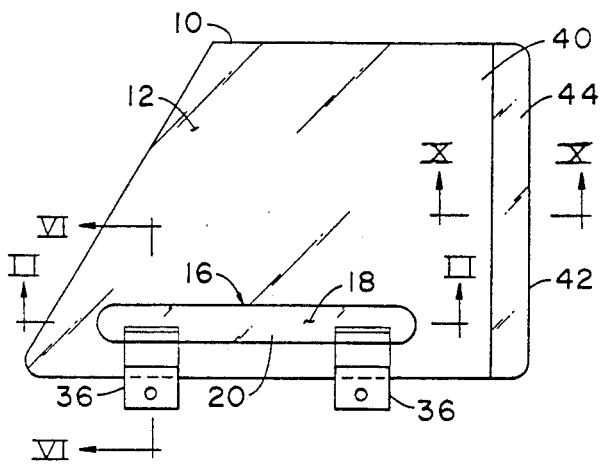
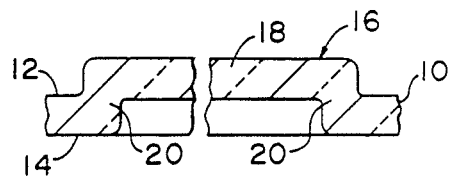
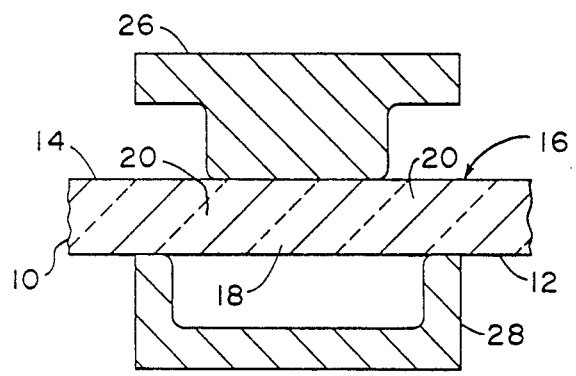
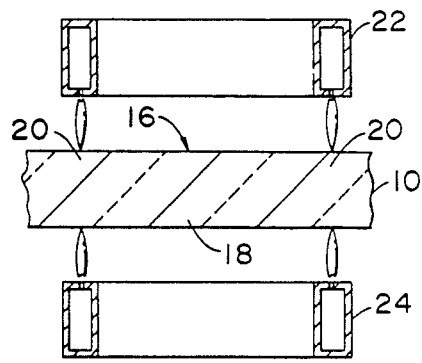
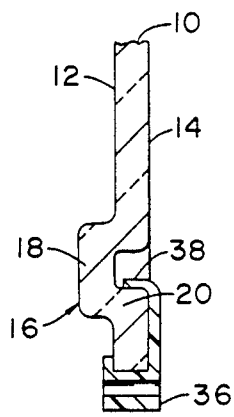
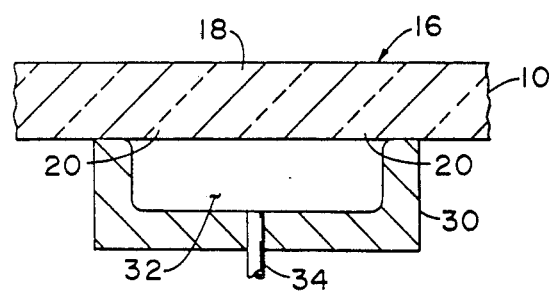
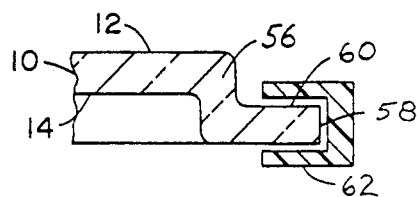

SHAPING GLASS SHEETS

BACKGROUND OF THE INVENTION

1 Field of Invention

This invention relates to shaping transparencies and more particularly to shaping selected portions of a glass transparency while maintaining the optical quality of the remaining portions of the glass.

2A Technical Considerations

Automotive windows are generally mounted in a vehicle either in a fixed position, such as a windshield or back window, or provided with a bracket and guide assembly that allows the window to move up and down along a track in the vehicle window frame, such as a side window. The bracket hardware is secured to an edge of the window in any convenient manner well known in the art, for example, by using adhesives. Since there are no direct bearing forces between the bracket and the generally planar surface of the window glass with such an arrangement, the adhesives must be formulated to provide adequate shear strength at the glass/bracket interface. As an alternative to adhesives and in order to more positively secure the bracket hardware to the glass, the bracket can be bolted directly to the glass. However, the necessity of drilling a hole through the glass results in potential defects in the glass at the hole that may result in venting and subsequent breakage of the glass.

It would be advantageous to form a glass window with an integral structure that provides for a more positive connection between the window and bracket hardware without affecting the glass strength of the window.

2B Patents of Interest

U.S. Pat. No. 3,282,013 to Boicey and 3,385,000 to Sturtevant et. al. teach window guide arrangements wherein the guide brackets are bolted directly to the window through holes drilled in the glass.

U.S. Pat. Nos. 3,193,367 and 3,582,454 to Giffen teach a glass forming operation wherein a sheet of heat softened glass drawn from a pool of molten glass is positioned over a forming die, pressed into the die, and severed from the remaining glass sheet by shearing elements. During the pressing operation, the entire sheet is at its softening temperature so that the entire glass sheet can be formed by the forming die. In addition, the forming die contacts the entire major surface of one side of the glass sheet.

U.S. Pat. No. 4,074,996 to Hagedorn et. al. teaches a method of bending glass sheets to a relatively sharp angle. The glass sheet is superheated along a line, for example by a radiant energy source, and articulated end sections of a primary press bending member sharply bends the glass sheet about superheated line.

U.S. Pat. No. 4,157,254 to Thomas et. al. and U.S. Pat. No. 4,184,864 to Reese teach a method of bending glass sheets to a sharp bend using an electroconductive heating element in a form of a heating ribbon to concentrate heat along the bending line.

U.S. Pat. No. 4,173,461 to Ebata et al teaches a method of bending a glass plate by heating the plate along a narrow zone to lower its electrical resistivity and then passing electric current through this zone to heat and soften the glass within this zone. The glass is then bent along the heated line.

U.S. Pat. No. 4,674,247 to Hayashi et al teaches a method of installing a glass window using a clamp member to secure the glass against a peripheral seal.

U.S. Pat. No. 4,749,400 to Mouly et al. teaches a method of cutting of glass by heating it along a line of cut to its softening point temperature and severing the glass along the line of cut while maintaining the optical properties of the glass.

U.S. Pat. No. 4,762,481 to Weaver teaches an encapsulated window assembly wherein guide members are formed integrally with a polymeric gasket material secured about the periphery of the window.

U.S. Pat. No. 4,762,904 to Nakama teaches a glass bracket to hold a glass part. The bracket has integral grooves which holds adhesive used to secure the bracket to the glass.

U.S. Pat. No. 4,776,132 to Gold teaches an assembly for mounting an automotive glass window which includes a bracket member with tabs that grip specially formed sections of the glass.

SUMMARY OF THE INVENTION

The present invention provides a method of shaping selected portions of a sheet of heat softenable material, and in particular to shaping selected portions of a transparency without altering the major portion of the transparency's optical properties. The shaped area, i.e. reform area, provides a structure integral with the sheet that can be positively engaged by additional hardware, e.g. a fixed or slidable bracket for connection to a window reciprocating mechanism to raise and lower the window in a window frame of the vehicle. The reform process can also be used to form an integral ledge along an edge of a window to guide its up and down movement in a vehicle door frame. In addition, the edge of the window can be offset from the remaining major portion of the window and positioned within a guide track to provide a flush glazing arrangement.

In one particular embodiment of the invention, the sheet is a glass sheet and selected portions the reform area are heated to their heat softening temperature while the remaining portions of the sheet are maintained at an elevated temperature at which the glass sheet will not fracture due to the heating of the selected portions and will not mark due to handling. After heating the glass, the selected portions are formed to offset the reform area relative to the remaining portions of the glass sheet. The glass is then cooled, leaving a discrete bulge or protrusion in the glass. Because the portions of the glass sheet outside the reform area are maintained at a temperature at which the glass will not mark, the optical properties of these portions of the glass are maintained throughout the reforming operation.

In an additional embodiment of the invention, the glass is shaped and reformed in a single operation. The glass sheet is heated to its heat deformation temperature while the reform area is heated to its higher heat softening temperature. The glass sheet is then pressed between a pair of complimenting press faces that include both the general surface curvature for the main portion of the glass sheet and specially formed surfaces for the reform area. The pressing operation shapes the main portion of the glass and offsets the reform area from the general surface curvature of the main glass portion.

BRIEF DESCRIPTION OF THE DRAWINGS

FIG. 1 illustrates a vehicle window incorporating features of the present invention.

FIG. 2 is a view through line II—II of FIG. 1 illustrating the reform area of the vehicle window, with portions removed for clarity.

FIG. 3 is a schematic cross-sectional view of a burner assembly used to heat the window in the reform area.

FIG. 4 is a schematic cross-sectional view illustrating the pressing dies used to form the reform area.

FIG. 5 is a view similar to FIG. 4 illustrating an alternate forming arrangement.

FIG. 6 is a view through line VI—VI of FIG. 1 showing a bracket secured to the vehicle window at the reform area.

FIG. 10 is a view through line X—X of FIG. 1 illustrating the vehicle window with a reformed integral glass guide.

DETAILED DESCRIPTION OF THE INVENTION

Figure 7:
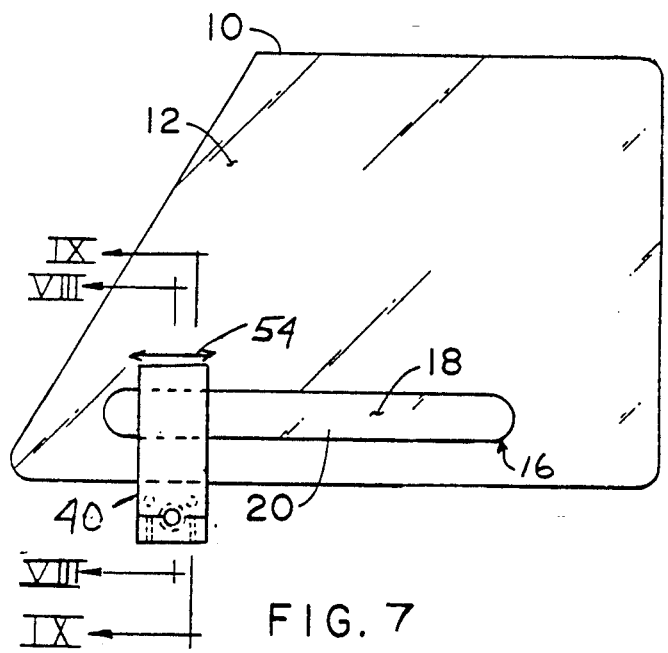
FIG. 7 is a vehicle window similar to that shown in FIG. 1 incorporating an alternate embodiment of the invention.

The present invention teaches specialized forming of glass but it should be appreciated that it can be used for shaping other materials, such as but not limited to polycarbonate and acrylic, where the surface and other optical properties of the material are to be maintained.

In describing the present invention, reference will be made to certain properties and reference temperatures of the glass. "Annealing point" and "strain point" are defined as the temperatures that correspond either to a specific rate of elongation of a glass fiber when measured by ASTM method C336 or a specific rate of midpoint deflection of a glass beam when measured by ASTM method C598. At the annealing point, internal stresses are substantially relieved in a matter of minutes. At the strain point, internal stresses are substantially relieved in a matter of hours. The range of temperatures between the annealing point and the strain point is called the "annealing range". During heat processing of glass, the glass temperature is lowered slowly (annealing) or quickly (tempering) through the annealing range. In particular, for typical soda-lime-silica float glass, the annealing point temperature is generally within the range of about 1000° F. to 1040° F. (538° C. to 560°), the strain point temperature is generally within the range of about 925° F. to 970° F. (496° C. to 521° C.), and the annealing range is about 925° F. to 1040° F. (496° C. to 560° C.). "Heat deformation temperature" is the temperature to which glass is generally heated to shape the glass using conventional bending techniques, as will be discussed later. For typical soda-lime-silica float glass, this temperature is generally within the range of about 1050° F. to 1250° F. (566° C. to 677° C.) depending on the complexity of the bend. "Heat softening temperature" is the temperature at which the glass will soften and flow but below the temperature at which the glass will vaporize. For typical soda-lime-silica float glass, the heat softening temperature is in a range of about 1325° F. to 1375° F. (718° C. to 746° C.). "Optical quality" connotes the extent to which the opposing major surfaces of the glass are planar and can be characterized by the optical power of its dominant transmitted defects. For glass having "float glass optical quality", the defects, in the form of surface irregularities, generally have a wavelength in a range of approximately 0.75" to 2" (1.91 centimeters to 5.08 centimeters) and an optical power on the order of 30 millidiopters or less.

FIGS. 1 and 2 illustrate a shaped glass sheet 10, and in particular, an vehicle window formed in accordance with the teachings to the present invention. Surfaces 12 and 14 of the window 10 each have a generally continuous main surface area with any change in surface curvature having a radius of curvature of about 6 inches (15.24 cm) or more, and a reform area 16 with major surfaces that are offset out of plane from the major surfaces of the glass sheet 10. Although not limited in the present invention, in the particular embodiment illustrated in these figures, reform area 16 is oblong in shape with a central portion 18 and transition section 20.

Referring to FIG. 3, a heater 22 directs concentrated, high temperature heat on a major surface of shaped glass sheet 10 to rapidly heat the transition section 20 of the reform area 16 to its heat softening temperature. The heater 22 may be any type of commercially available heat sources that can provide the required concentrated heat and direct it along the transition section 20. Although not limiting in the present invention, in the particular embodiment illustrated in FIG. 3, the heater 22 is a ring burner that generally corresponds to the oblong shape of reform area 16 and directs high temperature flames along the transition section 20. Fuel and oxygen lines (not shown) supply the heater 22 with the necessary combustants to produce a high temperature flame. Heaters such as resistance type heaters, high frequency dielectric heaters, plasma torch heaters, laser or electron beam heaters may also be used.

The heater 22 increases the temperature of the transition section 20 preferably to at or above the heat softening temperature so that the transition section 20 can be rapidly deformed to shape and offset the reform area 16. If required, in order to increase the speed at which the entire thickness of the glass sheet 10 is heated to its heat softening temperature, a second ring heater 24 may be positioned on the opposite side of the glass sheet 10 and aligned with the heater 22 as shown in FIG. 3 to direct its focus of heat along the transition section 20 from the opposite side of the glass sheet 10.

Because the heaters 22 and 24 focus a concentrated heat along a narrow band of the glass, there is a possibility of thermal shock in the glass, i.e. the glass may not have sufficient time to redistribute stresses within the glass established by the high temperature, thereby resulting in glass fracturing. To avoid this condition, the glass 10 is preheated to an elevated temperature sufficient to relieve any internal stresses resulting from the concentrated heating. However, in order the maintain the optical properties of those portions of the glass 10 spaced from the reform area 16, this elevated temperature should be at a level that allows the glass to be handled without marking or otherwise adversely affecting the glass' optical properties. Although not limiting in the present invention, for soda-lime-silica glass the entire glass sheet 10 is heated preferably to at least about its strain point temperature. At this temperature level, the glass can redistribute any internal stresses within the glass caused by the burners 22 and 24 while maintaining the float glass optical properties of those portions of the glass 10 spaced from the reform area 16. However it should be noted that during testing, the glass sheet 10 was preheated to temperatures as high as about the annealing point temperature and as low as 825° F. (454° C.) and successfully heated by the high temperature burners 22 and 24 without the glass sheet fracturing due to thermal shock from the burners 22 and 24 or adversely affecting the optical properties of those portions of the glass 10 spaced from the reform area 16.

Referring to FIG. 4, after the transition section 20 is heated to its heat softening temperature, the glass sheet 10 is positioned to align the reform area 16 between press dies 26 and 28 which abruptly offsets the reform area 16 out of plane from the major surfaces 12 and 14 of the glass sheet 10, i.e. reforms the glass, while the transition section 20 is still at least at about its heat softening temperature. In operation, die 26 approaches surface 14 while die 28 contacts opposite surface 12 of the glass 10. As die 26 penetrates the glass from one side, the heat softened glass in the transition section 20 flows and conforms to the surface of the dies 26 and 28, resulting in a reform area 16 being offset relative to the major surfaces of the glass sheet 10. Although not limiting in the present invention, in the particular embodiment illustrated in FIG. 2, the transition sections 20 of the reform area 16 are formed approximately perpendicular to the major surfaces of the glass sheet 10. Furthermore, on tests using 0.157 inch (4 mm.) thick glass, reform area 16 was offset relative to the glass sheet 10 an amount at least equal to the glass sheet 10 thickness.

After the reformed glass has been defined and stiffens enough to support itself, the dies 26 and 28 are retracted. The glass 10 is then cooled through its annealing range at a controlled rate to heat strengthen or temper the glass.

As an alternative to shaping the reform area 16 with press dies 26 and 28, the reform operation can be performed using a vacuum mold in a manner similar to that disclosed in U.S. Pat. Nos. 3,193,367 and 3,582,454, which teachings are incorporated by reference. Referring to FIG. 5, mold 30 with vacuum chamber 32 is positioned against surface 14 of glass sheet 10 at heated reform transition section 20. A vacuum is drawn in mold 30 through vacuum line 34 to urge the heat softened glass into the vacuum chamber 32 to form reform area 16.

The movement of the glass sheet 10, the heaters, and pressing dies relative to each other can be made in any convenient manner well known in the art, such as those disclosed in U.S. Pat. No. 4,749,400, which teachings are incorporated by reference. For example, the glass sheet 10 may remain at a single station while the heaters and dies move into and out of position. As an alternative, the glass sheet 10 may be moved to successive processing stations to sequentially heat, reform and cool the glass.

Although the reform process has been presented as a specialized shaping operation, separate from and occurring subsequent to an initial glass sheet shaping operation, it is contemplated that based on the teachings of this disclosure, the reforming operation can be performed simultaneously with the general shaping of a glass sheet. In particular, the entire glass sheet 10 can be heated to its heat deformation temperature while the transition section 20 of the reform area 16 could be heated to its heat softening temperature. The glass 10 would then be shaped using any convenient pressing shaping technique well known in the art, such as that disclosed in U.S. Pat. No. 4,662,925, which teachings are incorporated by reference. The press faces of the molds (not shown) in the press shaping operation would include a first portion having a surface configuration generally conforming to the final desired surface configuration of the glass 10 and a second portion corresponding to the shape and offset of the reform area. Because the glass sheet 10 when heated to its heat deformation temperature can be handled without marking the glass, the optical properties of the glass 10 outside of the reform area 16 are maintained throughout the combined shaping and reforming operation.

Furthermore, it is obvious that based on the teachings of this disclosure, the reforming operation can occur prior to shaping the remaining portions of the glass sheet 10, i.e. when the glass sheet is flat. After reforming, the flat sheet can be heated and shaped in any convenient manner as previously discussed.

Although the reform area 16 as shown in FIGS. 1 and 2 is oblong with a central area 18, it is contemplated that the reform area can be of any size or configuration. Furthermore, the width of the central area 18 of the reform area 16 shown in FIGS. 1 and 2 can be reduced or eliminated so that the entire reform area 16 can be heated to its heat softened temperature by a single line heater. As discussed earlier, the glass sheet 10 must also be heated to relieve any internal stresses resulting from the concentrated heat and prevent thermal fracturing of the glass.

The reform area 16 allows for a more positive attachment of window hardware to the glass sheet 10. FIG. 6 illustrates a bracket assembly that takes advantage of the unique shape of the reform area. In particular, bracket 36 includes finger portion 38 that engage the formed transition section 20 of the reform area 16. As a result, besides providing additional surface area for the bracket adhesive, the bracket 36 actually "hooks onto" the glass sheet 10 to better secure the bracket 36 to the glass sheet 10 as compared to conventional brackets that are glued onto the planar glass surfaces. To further improve the connection between the bracket 36 and glass sheet 10, the bracket 36 can be enlarged to capture the reform area 16 in a manner similar to that shown in FIGS. 7 through 9 which are discussed below. The bracket 36 may be used as a guide along the edge of the sheet 10 to direct the movement of the sheet 10 within a window frame (not shown). In addition, the reform area can be used as a reservoir to hold adhesives that are used to hold the bracket 36 to the glass sheet 10 or the glass sheet 10 to a mounting frame (not shown).

Figure 8:
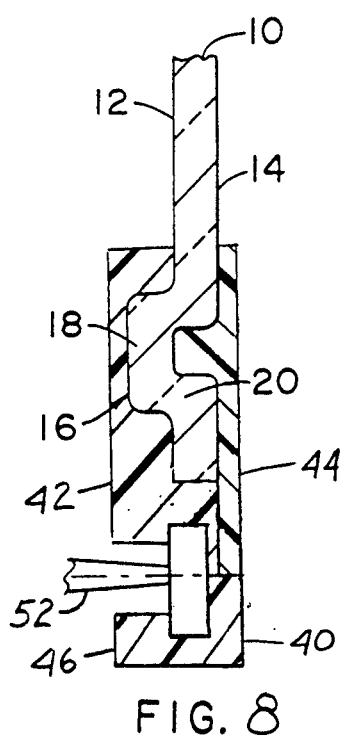
FIGS. 8 and 9 are views through lines VIII—VIII and IX—IX, respectively, of FIG. 7 illustrating an alternate bracket attachment to the reform area.
Figure 9:
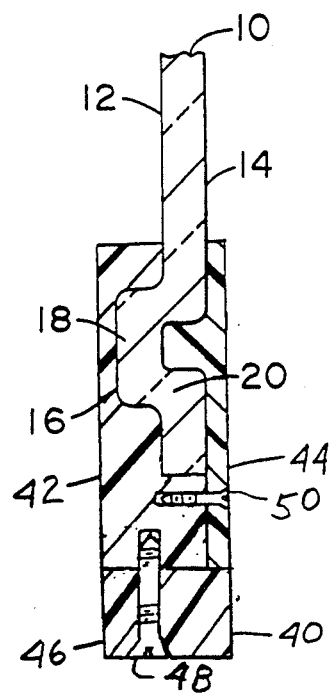

As an alternative to using the reform area 16 to enhance attachment of a bracket to the glass sheet 10, the reform area 16 may be used as a guide which allows a bracket to slide along the edge of the glass sheet 10. This is particularly useful for operating an automotive window where the window moving mechanism moves along an arc as it raises and lowers the window. Referring to FIGS. 7 through 9, bracket 40 includes a front member 42, a back member 44, and a base 46 which are assembled together by screws 48 and 50 (shown in FIG. 9 only) to form the bracket 40. Crank 52 from the window moving assembly (not shown) is captured within the bracket 40 by member 42 and base 46. As shown in FIGS. 8 and 9, when assembled, members 42 and 44 slidably capture the reform area 16 therebetween in such a manner that the bracket 40 can slide along the reform area 16 in a direction indicated by arrow 54 on FIG. 7. The reform area 16 operates as a guide for the movement of the bracket 40 along the edge of the glass sheet 10 as the crank 52 raises and lowers the window.

It should be noted that no portion of bracket 40 is permanently attached to the glass sheet 10.

The reform operation as taught herein can also be used to form a window guide integral the glass sheet 10. Referring to FIGS. 1 and 10, transition area 56 inboard of and extending along edge 58 of the glass sheet 10 is heated and reformed in a manner as discussed earlier to provide an offset ledge 60 that extends into a receiver 62 (shown only in FIG. 10) to guide the glass sheet 10 as it moves up and down within a window frame (not shown) while maintaining the optical quality of the remaining portion of the glass. As an alternative to having a single ledge that extends along the entire length of the glass sheet edge 58, the ledge may include one or more tab members (not shown) that extend along only a portion of the edge 58 of the glass sheet 10. The tab members are formed into ledge members to guide the movement of the glass sheet 10 within the receiver 62 in a manner as described earlier. Because the ledge 60 is offset from the major surfaces 12 and 14 of the glass sheet 10, the glass sheet 10 can be positioned flush with the exterior of a vehicle to provide a more aerodynamic surface. It would be obvious to one skilled in the art that ledge 60 could be extended about the periphery of the glass sheet 10 to provide a flush glazing arrangement wherein the ledge "frames" the window and is secured within a window support (not shown) while the central portion of the glass sheet 10 remains flush with the exterior of the vehicle (not shown).

The reform operation may also be used for ornamentation. For example, raised relief logos (not shown) can be added to the glass sheet 10 while maintaining the optical qualities of the remaining portion of the glass.

Throughout the heating and shaping operation disclosed herein, the optical quality of those portions of the glass 10 that are spaced from the reform area 16, and in particular its float glass optical quality, is maintained by controlling the temperature of the glass during the reforming operation. In addition, it has been taught that the reform operation can be performed as a separate operation performed either prior to or after forming the remaining portions of the glass sheet or it can be combined with a conventional glass sheet press bending operation.

The forms of the invention shown and described in this specification represent preferred embodiments. It is understood that various changes may be made without departing from the spirit of the invention as defined in the claimed subject matter which follows.

We claim:

1. A window with an offset portion comprised of:
 a sheet of glass having peripheral edges and a major surface, said major surface shaped to have a first portion and a second portion with said second portion being offset from said first portion, integral with said first portion and completely within and spaced from said peripheral edges of said sheet, and further having a transition section transverse to the major surface to provide said offset portion in the shape of a retention groove.

2. The window as in claim 1 wherein said second portion offset from said first portion is a first reformed section, said window further including a third portion, said third portion being a second reformed section forming an offset ledge section extending along a predetermined length of said peripheral edge of said sheet.

3. The window as in claim 2 wherein said second reformed section extends around the entire periphery of said sheet.

4. The window as in claim 1 further including a bracket secured to said second portion of said sheet.

5. The window as in claim 4 wherein said bracket is slidably captured within said second portion such that said bracket can move along said sheet in said second portion.

6. The window as in claim 1 wherein said window is an automotive transparency.

7. The window as in claim 1 wherein said sheet of glass is a sheet of float glass such that said window has float glass optical quality in at least said first portion.

8. The window as in claim 1 wherein said transition section with said first and second portions forming two included angles, one included angle between said first portion and said transition section and another included angle between said second portion and said transition section, said included angles being between about 90° and 135°.

9. A window with an offset portion comprised of:
 a sheet of glass having a first portion and a second portion with said second portion being offset from said first portion and integral with said first portion by a transition section, said transition section along with said first and second portions forming two included angles, one included angle between said first portion and said transition section and another included angle between said second portion and said transition section, said included angles being between about 90° and 135°.

10. The window of claim 9 wherein said window further includes a third portion offset from said first portion and completely within and spaced from said peripheral edges of said sheet.

11. A window with an offset portion comprised of:
 a sheet of glass having an offset ledge extending substantially along an entire length of a peripheral edge of said sheet defined by a first portion spaced from said peripheral edge of said sheet, a second portion including said peripheral edge of said sheet and a guide member having a groove for receiving said second portion, said groove and said second portion sized such that said second portion is slidable within said groove.

* * * * *